United States Patent [19]
Tully et al.

[11] Patent Number: 5,522,147
[45] Date of Patent: Jun. 4, 1996

[54] EDGE LOCATING DEVICE

[76] Inventors: Richard J. Tully, P.O. Box 111, Charlton City, Mass. 01508; Dennis P. Tully, 138 Stafford St., Charlton Depot, Mass. 01509; Steven F. Tully, 16 Glenshore Rd., Charlton City, Mass. 01508

[21] Appl. No.: 289,915

[22] Filed: Aug. 12, 1994

[51] Int. Cl.$^6$ ........................................... G01B 5/25
[52] U.S. Cl. .................... 33/567; 33/626; 33/535; 33/DIG. 1
[58] Field of Search .................. 33/567, DIG. 1, 33/626, 638, 640, 641, 535

[56] References Cited

U.S. PATENT DOCUMENTS

| | | | |
|---|---|---|---|
| 2,878,575 | 3/1959 | Ganson | 33/626 X |
| 4,319,400 | 3/1982 | Chung | 33/DIG. 1 |
| 4,434,559 | 3/1984 | Lauer et al. | 33/535 X |
| 5,046,262 | 9/1991 | Kerbaugh | 33/626 X |

FOREIGN PATENT DOCUMENTS

| | | | |
|---|---|---|---|
| 0557267 | 11/1943 | United Kingdom | 33/638 |
| 0599681 | 3/1948 | United Kingdom | 33/567 |

*Primary Examiner*—Christopher W. Fulton
*Attorney, Agent, or Firm*—James F. Baird

[57] ABSTRACT

An improved device and system to precisely locate a point on a workpiece. The device and system is also used to precisely position a work tool with respect to the workpiece. The device incorporates a probe end and a contact end. The contact end has a bottom facing contact surface that is smooth and planar within an exacting tolerance. The probe end may be cylindrical or spherical with a precise diameter B and a rear facing portion. The contact end is slideably positioned with its bottom facing contact surface firmly against a reference surface of the workpiece. The device is positioned in order that the rear facing portion of the probe end is firmly in contact with a second surface of the workpiece. The extensions of the plane of the second surface of the workpiece and the plane of the reference surface form an intersection, either real or imaginary. The plane of the second surface forms an angle with the perpendicular to the reference surface plane at the intersection. The device determines the distance between the perpendicular and the tangent to the front facing portion of the probe end, that is perpendicular to the reference surface plane. The location of a precise point may be determined by adding to or subtracting from the distance as measured.

10 Claims, 2 Drawing Sheets

EDGE LOCATING DEVICE

BACKGROUND OF THE INVENTION

For ages machinist, toolmakers and mold makers have had the requirement to determine the position of angular features including cavities in or on a workpiece in relation to an actual or theoretical edge or point. In some instances extensive, time consuming, complicated calculations have been relied upon. In preparing a workpiece to create the feature or cavity desired various work tools such as drills, boring tools, milling tools, reamers, end mills or electrodes are used. In some complicated applications more than one procedure is required. As work to create the feature or cavity progresses some portions of the workpiece are eliminated. The eliminated portions of the workpiece include edges critical for making certain accurate measurements. Measurements from the imaginary intersection of one of the surfaces of the feature or cavity and another surface of the feature or cavity may be required. It may be necessary to determine the measurement from the imaginary intersection of a surface of one of the features or cavities and a reference surface of the workpiece to a precise point on the workpiece.

Many devices have been created to help make such measurements possible. In using such devices it is necessary to use an actual edge or locate a theoretical edge by means of other devices or by complicated calculations. Where a theoretical edge is involved the accuracy of the measurement is suspect and the time required for the calculations is costly and inefficient in the workplace.

The shortcomings of the prior art makes it necessary to use more than one device and usually more than one person in order to locate a point on a workpiece when material has been removed where an edge, or intersection of two surfaces, would occur thereby requiring a measurement from an imaginary edge.

The same deficiencies exist in positioning a work tool at an angle in relation to the work piece. The accuracy of this measurement is critical in order that the feature or cavity that is to be created by the work tool will not only be at the proper and desired location but also at the proper and desired angle. In the event the location or angle are not as required material and time will be wasted in recalculating and preparing a new work piece.

The purpose and function of the present invention are to overcome the material cost, time and accuracy deficiencies of the present state of the industry.

SUMMARY OF THE INVENTION

The present invention is a device and system for accurately locating a point on a workpiece. The device and system is also used to precisely position and angle a work tool with respect to the workpiece.

The device incorporates a probe end and a contact end. The contact end is nearly box shaped. The nearly box shaped contact end has a bottom facing contact surface that is smooth and planar within an exacting tolerance. The contact end also has an upward facing surface, a rear facing surface, two nearly parallel side facing surfaces and a slopping upward and forward facing surface. The probe end may be cylindrical or spherical. The cylinder or sphere having a precise predetermined diameter B and a front facing portion and a rear facing portion.

The device is slideably positioned on a reference surface of the workpiece in such manner that the bottom facing contact surface forms firm smooth contact with the reference surface of the workpiece. The device is positioned in order that the rear facing portion of the probe end is firmly in contact with a second surface of the workpiece. The extensions of the plane of the second surface of the workpiece and the plane of the reference surface form an intersection, either real or imaginary. The perpendicular to the reference plane at the intersection forms an angle A with the extension of the second surface plane.

The device determines the distance E between the perpendicular and the tangent to the front facing portion of the probe end, that is perpendicular to the reference surface plane, by use of the equation:

$$E = COTAN(\tfrac{1}{2}90° - A°)B/2 + B/2.$$

The location of a precise point may be determined by adding to or subtracting from the distance as measured.

Using this distance and applying basic geometry equations and other measurements, it is possible to precisely locate any point on the workpiece.

This same device may be used to determine the position of a work tool, such as a boring tool or other reamer or milling tool where the tool has a predetermined fixed diameter measuring surface, with relation to the first surface of the workpiece by having the rear facing portion of the probe end of the device positioned against the first surface, the measuring surface of the tool positioned against front facing portion of the probe end of the device and the bottom facing contact surface of the device positioned on the referenced surface of the workpiece. By measuring certain distances and applying a basic geometry equation the position of the tool with relation to the first surface of the workpiece may be duplicated on the reference surface.

The ability to have the reference surface of the workpiece either parallel to the horizon, or the tool work direction vertical to the horizon or any variety merely requires a recalulation of the geometry equation. Once the position of the workpiece is determined and the work direction of the tool is calculated the geometric equation may be used to determine a spectrum of angles and required measurements for each such angle.

The device may be used to measure from the angle of the wall of an existing cavity or feature to different reference surfaces of the workpiece. In the event the wall of the cavity or feature is concave it would be necessary to use the device with the spherically shaped probe end. In the event the wall of the cavity or feature is convex either the cylinderically shaped or the spherically shaped probe end could be used.

The device disclosed is of a form that is both practical and economical in order to promote wide use. In addition to its preferred form, it may be made with a spherical contact surface for measuring inside or outside conical diameters. The inclusion of a magnet in the device permits stability when making measurements on ferrous workpieces.

In any of various forms the device should be made of a hardened material such as to prevent the precise diameter of the probe end from becoming deformed and also to prevent any change in the dimensions of the device especially as to the smooth contact surface and its relation with the outer diameter of the probe.

BRIEF DESCRIPTION OF THE DRAWINGS

The object and features of the invention may be understood with reference to the following detailed description of an illustrative embodiment of the invention, taken together with the accompanying drawings in which.

DESCRIPTION OF PREFERRED EMBODIMENT

Figure 1:
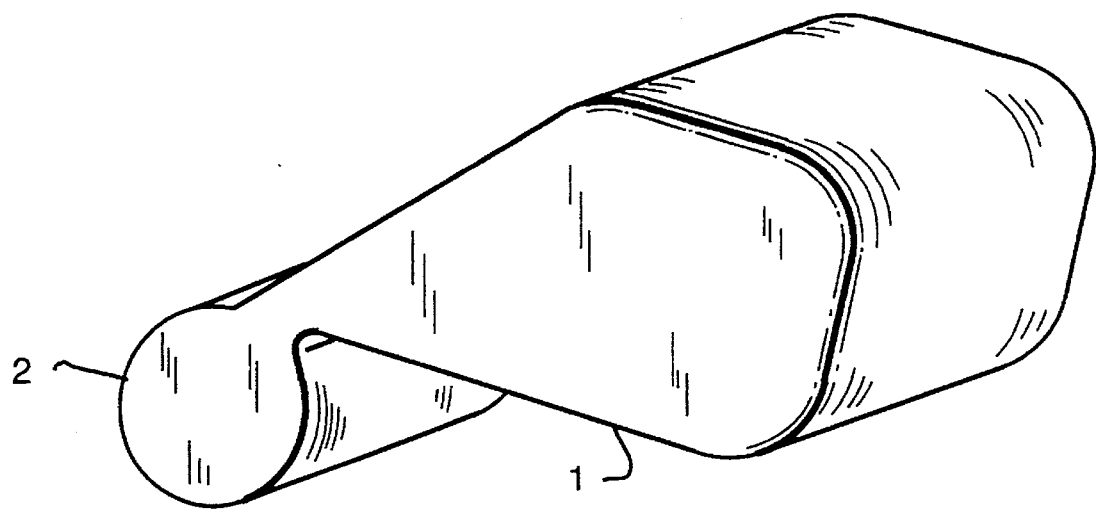
FIG. 1 illustrates a perspective view of the device indicating the contact end (1) and cylindrically shaped probe end (2).
Figure 2:
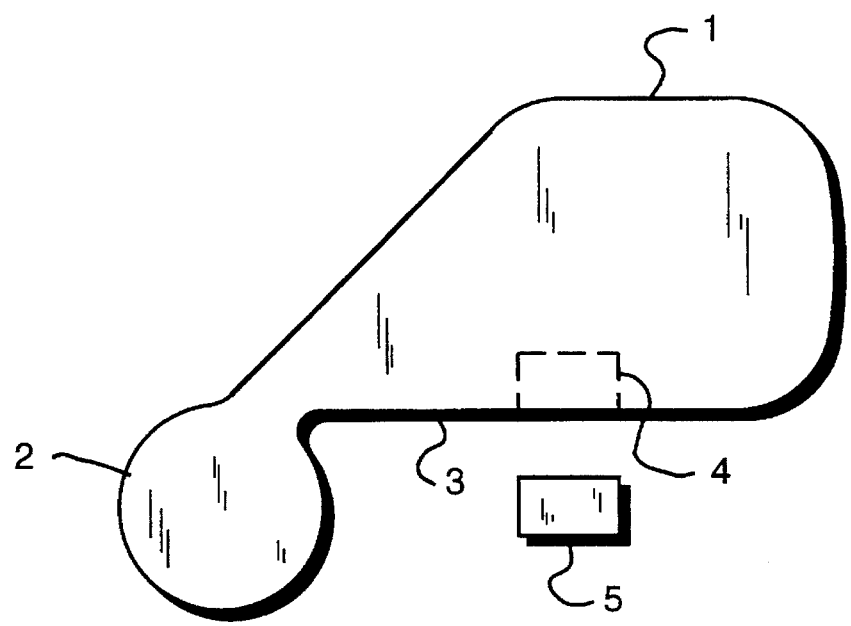
FIG. 2 illustrates a side view of the device illustrating the contact end (1), probe end (2), bottom facing contact surface (3), by dotted lines the optional magnet cavity (4), and the magnet (5).
Figure 3:
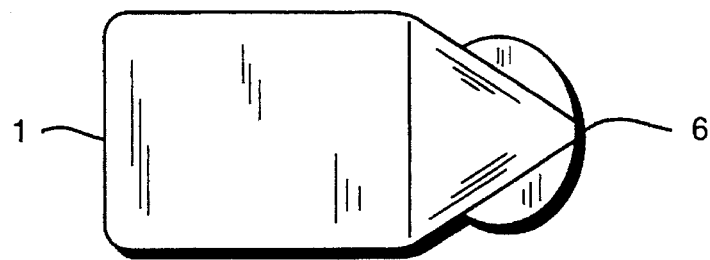
FIG. 3 illustrates a top view of the device indicating an embodiment with a pencil shaped probe (6) for conical measurements.
Figure 4:
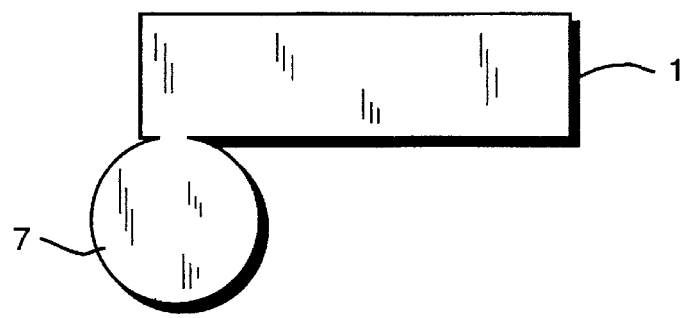
FIG. 4 illustrates side view of the device indicating a spherically shaped probe (7).
Figure 5:
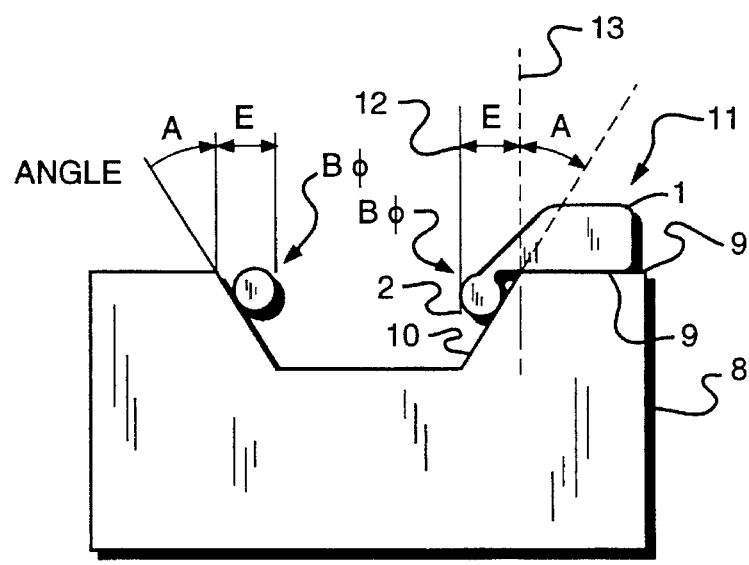
FIG. 5 illustrates the distance E that results for a probe end (2) with diameter B at angle of intersection A. Also indicated is a workpiece (8), reference surface (9), second reference surface (10), device (11), tangent to the device (12) and perpendicular to the reference surface (13)

Turning first to FIG. 1, there is shown the device with a cylindrically shaped probe (2), FIG. 2 illustrates a side view of the device. The bottom facing contact surface (3) would be in contact with the reference surface of the workpiece, the probe (2) in one application would be positioned in order that its rear facing portion would be in contact with a second surface of the workpiece. FIG. 5 illustrates the system of using the device. The extension of the plane of the reference surface of the workpiece and the extension of the plane of the second surface form an intersection. The extension of the second surface intersects the perpendicular to the reference surface at angle A. The table shown below illustrates, at various angles A, the measurements that would result of the distance E between the tangent to the front facing portion of the probe and the perpendicular at the intersection of the two surfaces. The diameter B of the probe (2) may be varied and the table illustrates three possible sizes: 250, 500 and 1,000.

E is determined by use of the geometry equation:

$$E = COTAN(\tfrac{1}{2}90° - A°)B/2 + B/2$$

| ANGLE "A" | B = .250 E | B = .500 E | B = 1.000 E |
|---|---|---|---|
| 1 DEG | .2521 | .5043 | 1.0007 |
| 2 DEG | .2544 | .5088 | 1.0177 |
| 3 DEG | .2567 | .5134 | 1.0269 |
| 4 DEG | .2590 | .5180 | 1.0361 |
| 5 DEG | .2614 | .5228 | 1.0456 |
| 6 DEG | .2638 | .5276 | 1.0553 |
| 7 DEG | .2662 | .5325 | 1.0651 |
| 8 DEG | .2687 | .5375 | 1.0751 |
| 9 DEG | .2713 | .5427 | 1.0854 |
| 10 DEG | .2739 | .5479 | 1.0958 |
| 11 DEG | .2766 | .5532 | 1.1065 |
| 12 DEG | .2793 | .5587 | 1.1174 |
| 13 DEG | .2821 | .5642 | 1.1285 |
| 14 DEG | .2849 | .5699 | 1.1399 |
| 15 DEG | .2878 | .5758 | 1.1516 |
| 16 DEG | .2908 | .5817 | 1.1635 |
| 17 DEG | .2939 | .5878 | 1.1757 |
| 18 DEG | .2978 | .5941 | 1.1882 |
| 19 DEG | .3002 | .6004 | 1.2009 |
| 20 DEG | .3035 | .6070 | 1.2140 |
| 21 DEG | .3068 | .6137 | 1.2274 |
| 22 DEG | .3103 | .6206 | 1.2412 |
| 23 DEG | .3138 | .6277 | 1.2554 |
| 24 DEG | .3174 | .6349 | 1.2699 |
| 25 DEG | .3212 | .6424 | 1.2848 |
| 26 DEG | .3250 | .6500 | 1.3001 |
| 27 DEG | .3289 | .6579 | 1.3159 |
| 28 DEG | .3330 | .6660 | 1.3321 |
| 29 DEG | .3372 | .6744 | 1.3488 |
| 30 DEG | .3415 | .6830 | 1.3660 |
| 31 DEG | .3459 | .6918 | 1.3837 |
| 32 DEG | .3505 | .7010 | 1.4020 |
| 33 DEG | .3552 | .7104 | 1.4209 |
| 34 DEG | .3600 | .7201 | 1.4403 |
| 35 DEG | .3651 | .7302 | 1.4605 |
| 36 DEG | .3703 | .7406 | 1.4813 |
| 37 DEG | .3757 | .7514 | 1.5028 |
| 38 DEG | .3812 | .7625 | 1.5251 |
| 39 DEG | .3870 | .7741 | 1.5482 |
| 40 DEG | .3930 | .7861 | 1.5722 |
| 41 DEG | .3992 | .7985 | 1.5971 |
| 42 DEG | .4057 | .8115 | 1.6230 |
| 43 DEG | .4124 | .8249 | 1.6499 |
| 44 DEG | .4194 | .8389 | 1.6779 |
| 45 DEG | .4267 | .8535 | 1.7071 |

FIG. 2 shows that a magnet (5) may be frictionally engaged within the cavity (4) in order to provide added stability when making measurements.

The device may be marked to measure the distance to a precise point on the workpiece.

From the foregoing description it will be apparent that modifications can be made to the apparatus without departing from the teaching of the present invention. Accordingly, it is distinctly understood that the invention is not limited to the preferred embodiment but may be embodied and practiced within the scope of the following claims.

We claim the following:

1. A device for measuring the distance between the perpendicular to a reference surface of a workpiece, at the intersection of the extension of the plane of said reference surface and the extension of the plane of a second surface of said workpiece, and the tangent, to the device that is perpendicular to said reference surface, in order to precisely locate a point on the workpiece comprising:

in combination a workpiece having a plurality of surfaces, including a reference surface and a second surface, the extension of the plane of said reference surface forming an intersection with the extension of the plane of said second surface such that angle A is formed between the extension of the plane of the second surface and the perpendicular to the reference surface;

an object formed of a hardened material;

said object having a probe end and a contact end, the contact end being formed in a shape that is nearly boxlike;

the contact end having an upward facing surface, a rear facing surface, two parallel side facing surfaces, a sloping upward and forward facing surface, and a bottom facing contact surface, the bottom facing contact surface being smooth and planar within an exacting tolerance;

said probe end being cylindrically shaped being an extension of said contact end with the axis of the cylindrically shaped probe end being parallel to said contact end bottom facing contact surface, the cylindrically shaped probe end having a surface with a precise and predetermined outer diameter B, the outer diameter surface having an upward facing portion, downward facing portion, front facing portion and a rear facing contact portion, the cylindrically shaped probe end outer diameter forming nearly a 360' surface area with a small portion not being exposed where it acts as an extension of the contact end;

the cylindrically shaped probe end being angled in order that an extension of the contact end bottom facing contact surface would make precise contact at the point where the upward facing portion of the outer diameter surface of the probe end occurs;

said object being sized and shaped in order that the contact end bottom facing contact surface rests on the reference surface of the workpiece with the probe end rear facing contact surface resting against the second surface of the workpiece, allowing measurement of a distance E between a tangent, to the front facing portion of said probe, and said perpendicular, at the intersection of the planes of the second surface and the reference surface of the workpiece, said tangent being perpendicular to the reference surface.

2. A device according to claim 1, further comprising:

wherein a cavity of a predetermined size and shape is formed in the bottom facing contact surface of the contact end, and a magnet sized and shaped to fit and be frictionally secured within said cavity.

3. A device and system for measuring the distance between the perpendicular to reference surface of a workpiece, at the intersection of the extension of the plane of said reference surface and the extension of the plane of a second surface of said workpiece, and the tangent, to the device that is perpendicular to said reference surface, in order to precisely locate a point on the workpiece comprising:

a workpiece having a plurality of surfaces, including a reference surface and a second surface, the extension of the plane of the reference surface forming an intersection with the extension of the plane of the second surface such that angle A is formed between the extension of the plane of the second surface and the perpendicular to the reference surface;

an object formed of a hardened material, said object having a probe end and a contact end, the contact end being formed in a shape that is nearly boxlike, the contact end having an upward facing surface, a rear facing surface, two parallel side facing surfaces, a sloping upward and forward facing surface, and a bottom facing contact surface, the bottom facing contact surface being smooth and planar within an exacting tolerance, said probe end being cylindrically shaped being an extension of said contact end with the axis of the cylindrically shaped probe end being parallel to said contact end bottom facing contact surface, the cylindrically shaped probe end having a surface with a precise and predetermined outer diameter B, the outer diameter surface having an upward facing portion, downward facing portion, front facing portion and a rear facing contact portion, the cylindrically shaped probe end outer diameter forming nearly a 360' surface area with a small portion not being exposed where it acts as an extension of the contact end, the cylindrically shaped probe end being angled in order that an extension of the contact end bottom facing contact surface would make precise contact at the point where the upward facing portion of the outer diameter surface of the probe end occurs, said object being sized and shaped in order that the contact end bottom facing contact surface rests on the reference surface of the workpiece with the probe end rear facing contact surface resting against the second surface of the workpiece, a distance E between a tangent, to the front facing portion of said probe, and said perpendicular, at the intersection of the planes of the second surface and the reference surface of the workpiece being determined by the equation $$E = \mathrm{COTAN}(\tfrac{1}{2} 90° - A°) B/2 + B/2,$$

said tangent being perpendicular to the reference surface.

4. A device and system according to claim 3, further comprising:

wherein a cavity of a predetermined size and shape is formed in the bottom facing contact surface of the contact end, and a magnet sized and shaped to fit and be frictionally secured within said cavity.

5. A device for measuring the distance between the perpendicular to a reference surface of a workpiece, at the intersection of the extension of the plane of said reference surface and the extension of the plane of a second surface of said workpiece, and the tangent, to the device that is perpendicular to said reference surface, in order to precisely locate a point on the workpiece comprising:

a contact means adapted to make contact with the reference surface of a workpiece being the contact end of an object formed of a hardened material, the contact end of the object being formed in a shape that is nearly boxlike, the contact end of the object having an upward facing surface, a rear facing surface, two parallel side facing surfaces, a sloping upward and forward facing surface, and a bottom facing contact surface, the bottom facing contact surface being smooth and planar within an exacting tolerance, a probe means adapted to make contact with a second surface of the workpiece being the probe end of the object being an extension of said contact end with the axis of the probe end being parallel to said contact end bottom facing contact surface, the probe end having an outer diameter surface being a curved surface having a precise and predetermined outer diameter B, the outer diameter surface having an upward facing portion, downward facing portion, front facing portion and a rear facing contact portion, the probe end outer diameter surface forming nearly a 360' surface area with a small portion not being exposed where it acts as an extension of the contact end, the probe end being angled in order that an extension of the contact end bottom facing contact surface would make precise contact at the point where the upward facing portion of the outer diameter surface of the probe end occurs, said contact means and probe means being sized and shaped in order that the contact end bottom facing contact surface rests on the reference surface of the workpiece with the probe end rear facing contact surface resting against the second surface of the workpiece, an extension of the plane of the second surface of the workpiece forming an intersection with an extension of the plane of the reference surface of the workpiece such that angle A is formed between the extension of the plane of the second surface and the perpendicular to the reference surface, allowing measurement of a distance E between a tangent, to the front facing portion of said probe, and said perpendicular, at the intersection of the planes of the second surface and the reference surface of the workpiece, by use of the formula, $$E = COTAN(½90° - A°)B/2 + B/2,$$

said tangent being perpendicular to the reference surface.

6. A device according to claim 5 further comprising:

wherein a cavity of a predetermined size and shape is formed in the bottom facing contact surface of the contact end of the contact means, and a stability means being a magnet sized and shaped to fit and be frictionally secured within said cavity.

7. A device according to claim 5 further comprising:

wherein said probe end is cylindrically shaped.

8. A device according to claim 7 further comprising:

wherein a cavity of a predetermined size and shape is formed in the bottom facing contact surface of the contact end, and a magnet sized and shaped to fit and be frictionally secured within said cavity.

9. A device and system according to claim 5 further comprising:

wherein said probe end is spherically shaped.

10. A device and system according to claim 9 further comprising:

wherein a cavity of a predetermined size and shape is formed in the bottom facing contact surface of the contact end, and a magnet sized and shaped to fit and be frictionally secured within said cavity.

* * * * *